United States Patent [19]

Reum

[11] Patent Number: 5,131,033
[45] Date of Patent: Jul. 14, 1992

[54] SEALING CURRENT GENERATOR FOR A TELEPHONE CIRCUIT

[75] Inventor: Peter M. Reum, Littleton, Colo.
[73] Assignee: XEL Communications, Inc., Aurora, Colo.
[21] Appl. No.: 524,296
[22] Filed: May 15, 1990
[51] Int. Cl.[5] .......................................... H04M 19/08
[52] U.S. Cl. ................................... 379/413; 379/324; 379/394; 379/402; 379/403
[58] Field of Search ............... 379/324, 394, 413, 400, 379/401, 402, 403, 404, 30, 27, 31, 344

[56] References Cited

U.S. PATENT DOCUMENTS

| | | | |
|---|---|---|---|
| 3,982,080 | 9/1976 | Ukeiley | 379/403 |
| 4,716,358 | 12/1987 | Fucito | 379/413 X |
| 4,766,606 | 8/1988 | Bardutz et al. | 379/344 |
| 4,771,449 | 9/1988 | Kiko et al. | 379/402 X |
| 4,887,278 | 12/1989 | Gupta | 379/394 X |
| 4,984,267 | 1/1991 | Martinez | 379/324 X |

*Primary Examiner*—James L. Dwyer
*Assistant Examiner*—Magdy W. Shehata
*Attorney, Agent, or Firm*—Dorr, Carson, Sloan & Peterson

[57] ABSTRACT

A sealing current generator for a telephone circuit provides a conventional nominal DC bias current in a telephone loop, and also temporarily provides a higher "zap" current whenever the DC current path is broken and then reapplied to the telephone loop. During the "zap" period, the voltage placed across the telephone loop is progressively increased in a number of predetermined steps if the current actually measured in the telephone loop fails to exceed a minimum value. The voltage is then maintained at its last level for the remainder of the "zap" period, after which the device returns to its base mode of providing a nominal DC bias current to the telephone loop.

12 Claims, 2 Drawing Sheets

SEALING CURRENT GENERATOR FOR A TELEPHONE CIRCUIT

BACKGROUND OF THE INVENTION

1. Field of the Invention

The present invention relates generally to the field of telephony. More specifically, the present invention discloses a current generator which provides a conventional nominal DC bias current in a telephone loop, and which also temporarily provides a higher "zap" current in cases of high telephone loop resistance.

2. Statement of the Problem

Telephone loop resistances vary widely depending on a number of factors, including the length and condition of the telephone loop. In particular, following initial installation or subsequent repair of a telephone loop, splice resistances may present a substantial problem. Other electrical anomalies may also result from splices and other connections made during installation or repair of a telephone loop. The prior art recognizes that such splice resistances and other anomalies can often be reduced or eliminated by temporarily introducing a relatively high "zap" current into the telephone loop for a few seconds following installation or repair. Ideally, the voltage placed across the telephone loop should be automatically adjusted by the generator to keep the current within the desired range of values.

The portions of the circuitry in the present invention relating to regulation of the nominal DC bias current in the telephone loop, and the longitudinal balance circuitry are conventional. Examples of such circuitry are shown in the following prior art references:

| Inventor | Patent No. | Issue Date |
|---|---|---|
| Huft, et al. | 4,577,064 | Mar. 18, 1986 |
| Huft | 4,560,834 | Dec. 24, 1985 |

3. Solution to the Problem

None of the prior art references disclose a device for generating a "zap" current in which the voltage placed across the telephone loop is automatically increased in a number of predetermined steps if the current actually measured by the device in the telephone loop fails to exceed one or more predetermined minimum values.

SUMMARY OF THE INVENTION

This invention discloses a sealing current generator for a telephone circuit which provides a conventional nominal DC bias current in a telephone loop, and also temporarily provides a higher "zap" current after initial power-up and whenever the DC current path is broken and then reapplied to the telephone loop. During the "zap" period, the voltage placed across the telephone loop is progressively increased in a number of predetermined steps if the current actually measured in the telephone loop fails to exceed a minimum value. The voltage is then maintained at its last level for the remainder of the "zap" period, after which the device returns to its base mode of providing a nominal DC bias current to the telephone loop.

A primary object of the present invention is to provide a current generator which introduces a standard DC bias current into the telephone loop, and which also temporarily introduces a higher "zap" current into the telephone loop following initial installation or repair. The voltage placed across the telephone loop to create this "zap" current is automatically adjusted by the generator to compensate for telephone loop resistance.

Another object of the present invention is to provide a suitable "zap" current in telephone loops having a resistance substantially greater than conventionally possible by effectively boosting, if necessary, the available battery voltage placed across the telephone loop.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
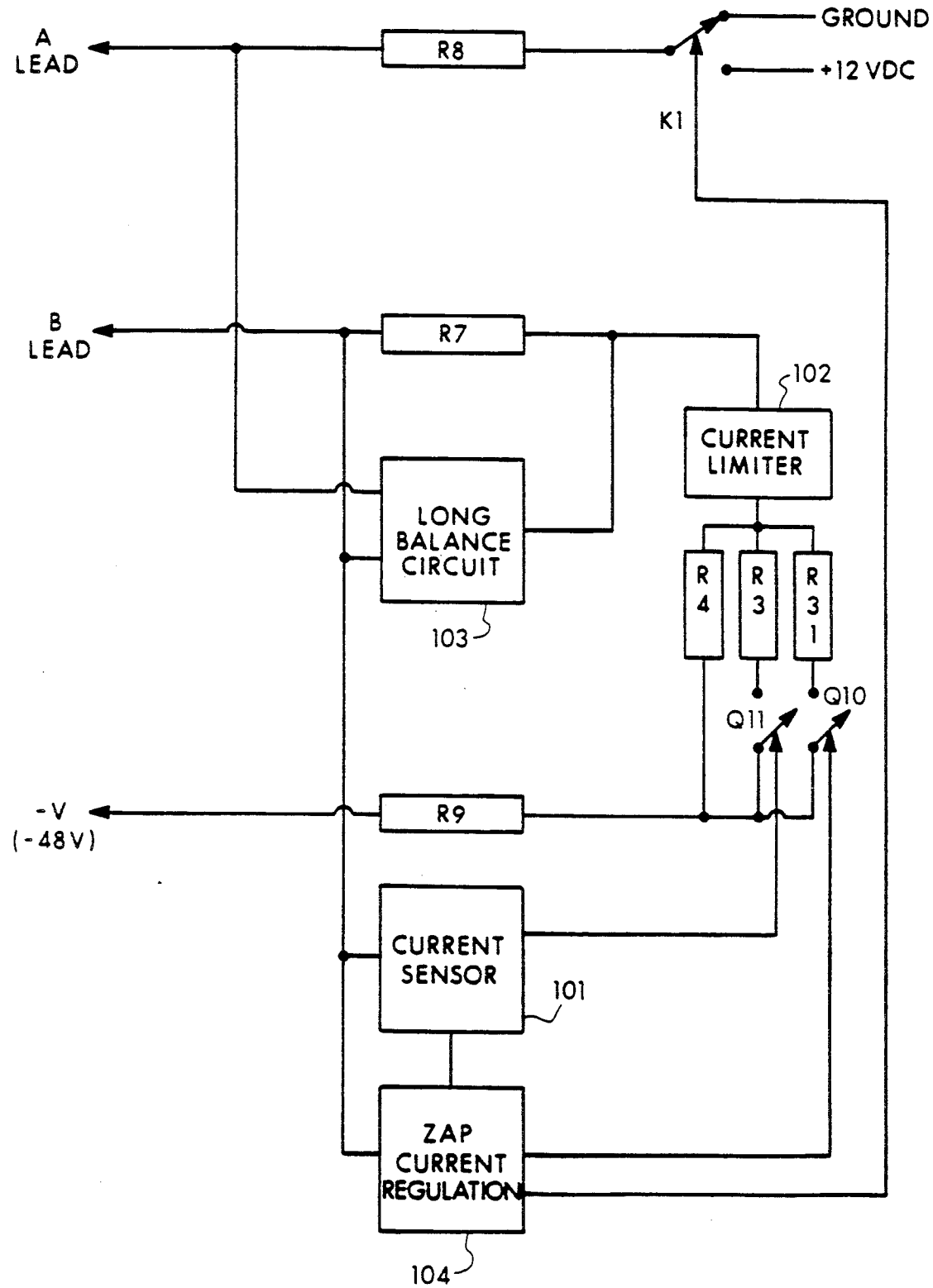
FIG. 1 is a block diagram of the present invention.
Figure 2:
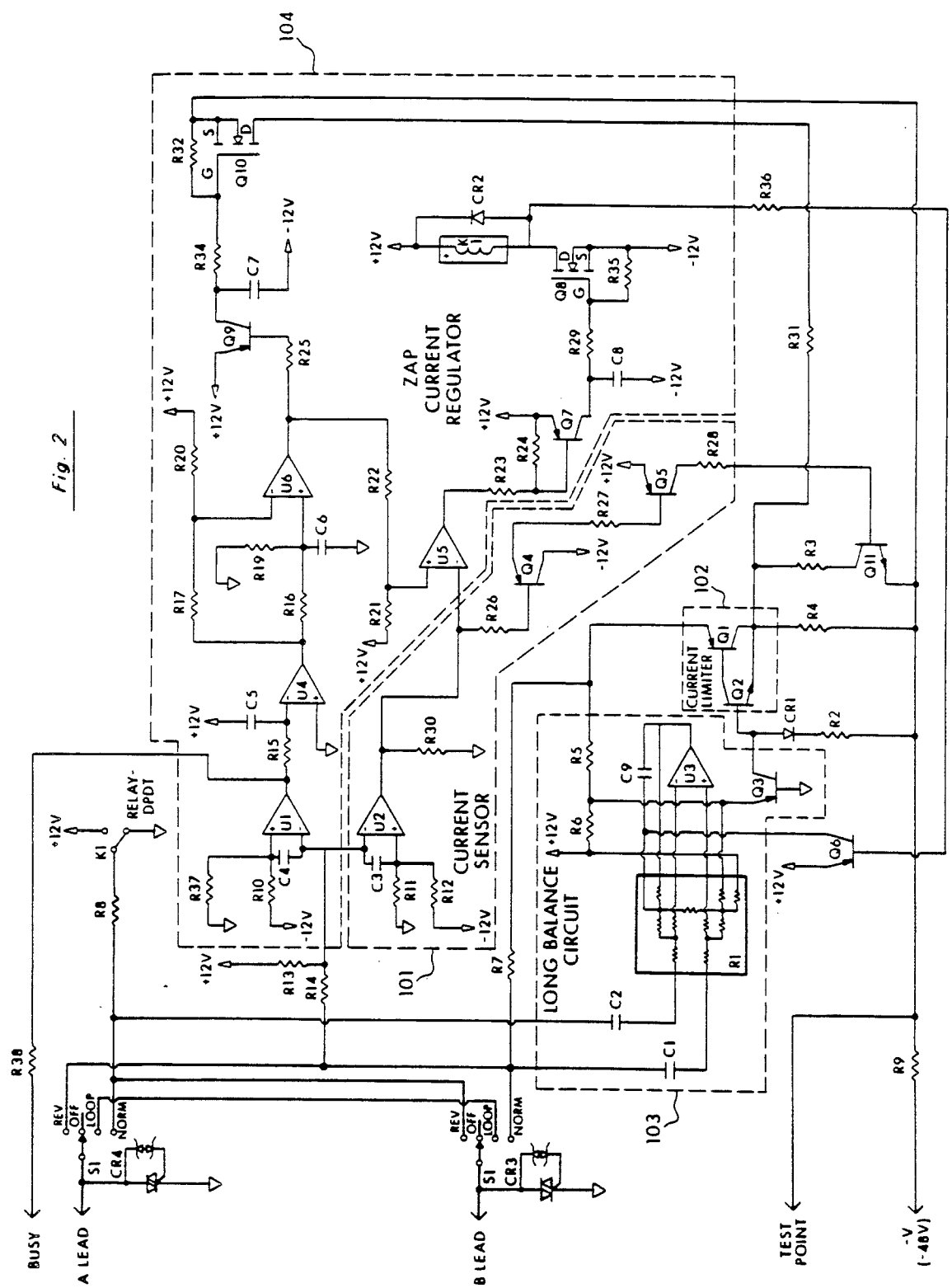
FIG. 2 is a detailed schematic diagram of one embodiment of the present invention corresponding to FIG. 1.

Turning to FIG. 1., a block diagram of the present invention is shown. During normal conditions, the current sensor 101 and current limiter 102 (with its associated resistors R3 and R4) maintain a standard DC current of 20 to 30 ma in the telephone loop. This DC current is conventionally referred to as the battery current, monitoring current, or DC bias current. As shown in FIG. 1, under normal conditions, lead "A" of the telephone loop is connected to ground through resistor R8. Lead "B" of the telephone loop is connected through the current limiter and resistors R4, R3, R31, and R9 to a conventional voltage source $-V$ ($-48$ VDC). As shown in FIG. 2, the current limiter 102 is comprised of a Darlington pair of transistors Q1 and Q2. The battery current through these transistors and in the telephone loop is therefore effectively limited by the parallel combination of resistors R3, R4, and R31 in series with resistor R9.

The current sensor 101 detects whether the current in the telephone loop is at least 30 ma. If this battery current is less than 30 ma, operational amplifier U2 switches on transistor Q4, which then turns on transistors Q5 and Q11. As shown in FIG. 1, transistor Q11 acts as a switch controlling whether resistor R3 is effectively in parallel combination with resistor R4. Current conducted by transistor Q11 flows through resistor R3, thereby increasing the maximum battery current provided by the current limiter transistors Q1 and Q2. If the current sensor 101 detects more than 30 ma in the telephone loop, U2 turns off transistors Q4, Q5, and Q11. Since no current is conducted through Q11 and R3, the current limiter transistors Q1 and Q2 provide less battery current for the telephone loop. By means of this control system, the battery current in the telephone loop is effectively maintained at a level of approximately 30 ma during normal conditions.

The longitudinal balance circuit 103 shown in both figures is of conventional design. Its purpose is to maintain longitudinal balance of each leg of the telephone loop by minimizing the effect of extraneous longitudinal AC voltages induced in the loop.

The second mode of operation of the present invention (i.e. "zap" mode) occurs after initial power-up or whenever the battery current path is broken and then reestablished in the telephone loop. In this second mode of operation, the zap current regulator 104 shown in FIG. 1 causes a relatively high "zap" current to be temporarily introduced into the telephone loop to help break down splice resistances and other associated telephone anomalies. The zap current is applied for approximately 3 to 5 seconds. In the present invention, this "zap" mode is essentially a two step process.

As mentioned previously, zap mode begins after initial power-up or whenever the battery current path is broken and then reestablished. Both of these events have the effect (through the RC combination of C4, R37 and R10) of temporarily placing a voltage across capacitor C4 and across the inputs of operational amplifier U1, which in turn causes U1 to output a high signal. This provides a busy indication to the transmission unit through R38, as shown in FIG. 2. The high output signal of U1 also causes operational amplifiers U4 and U6 to produce a negative spike to temporarily turn on transistor Q9. While transistor Q9 is conducting, it charges capacitor C7. Once C7 is charged, this capacitor turns on field effect transistor ("FET") Q10, which allows current to flow through resistor R31 and thereby increases the battery current through the current limiter transistors Q1 and Q2 and the telephone loop. In other words, as shown in FIG. 1, FET Q11 acts as a switch controlling whether resistor R31 is effectively in parallel combination with resistors R3 and R4. The maximum battery current limit in this state is approximately 50 ma.

The device then proceeds to sense the actual amount of battery current flowing in the telephone loop. If the battery current measured by the current sensor 101 is less than 30 ma, operational amplifier U2 outputs a high signal, as discussed above, which is connected to the negative terminal of operational amplifier U5. The positive terminal of U5 is connected to the output of U6. Thus, the positive terminal of U5 is low with respect to the negative terminal of U5 only while the output of U is low. This situation exists only when the device is in "zap" mode, and the battery current in the telephone loop is less than 30 ma. If both of these conditions are met, operational amplifier U5 of the zap current regulator outputs a low signal which turns on transistor Q7. Q7 then charges capacitor C8. Once charged, C8 turns on FET Q8, which energizes the coil of relay K1. K1 switches in a +12 VDC voltage source in place of ground through resistor R8 to the "A" lead of the telephone loop. In addition, when Q8 is on, transistor Q6 is thereby switched on and the longitudinal balance circuit 103 is effectively removed from operation as shown in FIG. 2. The −48 VDC voltage source connected through the current limiter to the "B" lead, in series with +12 VDC voltage source connected to the "A" lead, effectively applies an unlimited 60 volts across the telephone loop. In other words, by activating relay K1, the device automatically boosts the standard −48 VDC battery voltage to 60 volts for longer loops, or loops otherwise having a higher resistance. Once Q8 is turned on, it remains on for approximately 3 to 5 seconds, i.e. while capacitor C8 remains charged, to provide a boosted zap current for the desired period of time.

The above disclosure sets forth a number of embodiments of the present invention. It should be understood that the current levels, voltages, time periods, and component values discussed herein are merely for the purposes of example, and are not intended to limit the scope of the present invention. Other arrangements or embodiments, not precisely set forth, could be practiced under the teachings of the present invention and as set forth in the following claims.

TABLE 1

| Component | Value |
|---|---|
| C1, C2, C4, C6 | 0.1 μF |
| C3 | .01 μF |
| C5 | .22 μF |
| C7, C8 | 1 μF |
| R2 | 1.87K ohms |
| R3 | 909 ohms |
| R4 | 48 ohms |
| R5 | 100K ohms |
| R6 | 24.9K ohms |
| R7, R8 | 68 ohms |
| R9 | 10 ohms |
| R10 | 41.2K ohms |
| R11 | 22.6K ohms |
| R12 | 75.8K ohms |
| R13, R16, R17, R20, R22 | 100K ohms |
| R14, R21 | 200K ohms |
| R15, R32, R35 | 866K ohms |
| R19 | 147K ohms |
| R23, R25, R36, R38 | 46.4K ohms |
| R24 | 348K ohms |
| R26 | 56.3K ohms |
| R27, R28, R29, R34 | 20K ohms |
| R31 | 91.6 ohms |
| R37 | 59K ohms |

I claim:

1. In a telephone battery feed circuit which provides a predetermined bias current to an associated telephone loop, a sealing current circuit for applying a temporarily increased current to said telephone loop, comprising:
   current sensing means for measuring the DC loop current flowing in said associated telephone loop;
   means for generating an ordered sequence of at least two DC currents, each of predetermined magnitude and temporal duration, with each successive DC current in said ordered sequence of DC currents being of greater magnitude than the previous DC current in said ordered sequence;
   means responsive to an interruption in the flow of said bias current in said associated telephone loop for applying a first DC current in said ordered sequence to said associated telephone loop when said bias current is present in said associated telephone loop immediately following said interruption; and
   means responsive to said current sensing means determining that said measured DC loop current is less than a predetermined threshold, for sequentially applying successive ones of said ordered sequence of DC currents to said associated telephone loop until said measured DC current exceeds said predetermined threshold.

2. In a telephone battery feed circuit which provides a predetermined bias current to an associated telephone loop, a sealing current circuit for applying a sealing current to said telephone loop, comprising:
   current sensing means for measuring the DC loop current flowing in said associated telephone loop;
   current generator means for applying a DC current to said associated telephone loop of magnitude and duration regulated by a control signal;
   means for generating said control signal, wherein said control signal consists of a set of predefined levels, said set of predefined levels corresponding to an ordered sequence of DC currents, each of predetermined magnitude, with each successive DC current in said ordered sequence of DC currents being of greater magnitude than the previous DC current in said ordered sequence;

means responsive to an interruption in the flow of said bias current in said associated telephone loop for applying a control signal of a selected level and predetermined duration to said current generating means to apply a selected DC current of said temporal duration in said ordered sequence to said associated telephone loop immediately following conclusion of said interruption; and means responsive to said current sensing means determining that said measured DC loop current is less than a predetermined threshold, for sequentially applying successive ones of said predefined levels of said control signals to said current generating means, each of said predetermined temporal duration, to apply said ordered sequence of DC currents to said associated telephone loop until said measured DC current exceeds said predetermined threshold.

3. A sealing current generator for a telephone circuit, said generator comprising:

current sensing means adapted to sense whether the electrical current in said telephone circuit exceeds a predetermined value;

current generating means adapted to introduce an electric current in said telephone circuit, said electric current being subject to a maximum limit determined by a control signal;

control means connected to said current sensing means and connected to said current generating means to provide said control signal, said control means adapted to sense whenever continuity of said telephone circuit is opened and closed again, said control means having the following states:

(a) a first state in which said control signal is fixed to cause said current generating means to maintain a conventional battery feed current in said telephone circuit; and (b) a second state commencing whenever said control means senses that continuity of said telephone circuit is opened and closed again, and continuing thereafter for a predetermined period of time; said control means changing said control signal during said second state to progressively increase the maximum current limit of said current generating means in a number of predetermined increments until said current sensing means indicates that the electrical current flowing in said telephone circuit exceeds its predetermined value, said control means thereafter maintaining said control signal for the remainder of said period of time, and then restoring said control signal to its first state.

4. The sealing current generator of claim 3, wherein said current generating means comprises:

a voltage source; and current limiting means connected in series with said voltage source across said telephone circuit, the maximum current flowing through said current limiting means being controlled by said control signal provided by said control means.

5. The sealing current generator of claim 4, wherein said current limiting means comprises:

a plurality of resistors in parallel connection with one another, and in series with said voltage source; and a number of switching means controlled by control signals provided by said control means, each switching means in series connection with one of said resistors, said switching means adapted to permit said control means to selectively control which of said resistors are in parallel combination with one another.

6. A sealing current generator for a telephone circuit, said generator comprising:

current sensing means adapted to sense whether the electrical current in said telephone circuit exceeds a predetermined value;

current generating means adapted to place a voltage across said telephone circuit to produce a resulting current in said telephone circuit, the maximum value of said voltage being determined by a control signal;

control means connected to said current sensing means and to said current generating means, adapted to sense whenever continuity of said telephone circuit is opened and closed again, said control means having the following states:

(a) a first state in which said control signal is fixed to cause said current generating means to maintain a conventional battery feed current in said telephone circuit; and (b) a second state commencing whenever said control means senses that continuity of said telephone circuit is opened and closed again, and continuing thereafter for a predetermined period of time; said control means changing said control signal during said second state to progressively increase the voltage placed across said telephone loop by said current generating means in a number of predetermined increments until said current sensing means indicates that the electrical current flowing in said telephone circuit exceeds its predetermined value, said control means thereafter maintaining said control signal for the remainder of said period of time, and then restoring said control signal to its first state.

7. The sealing current generator of claim 6, wherein said current generating means comprises:

a voltage source; and current limiting means connected in series with said voltage source across said telephone circuit, the maximum current flowing through said current limiting means being controlled by said control signal provided by said control means.

8. The sealing current generator of claim 7, wherein said current limiting means comprises:

a plurality of resistors in parallel connection with one another, and in series with said voltage source; and a number of switching means controlled by control signals provided by said control means, each switching means in series connection with one of said resistors, said switching means adapted to permit said control means to selectively control which of said resistors are in parallel combination with one another.

9. A sealing current generator for a telephone circuit having two leads, said generator comprising:

current sensing means adapted to sense whether the electrical current in said telephone circuit exceeds a predetermined value;

a primary voltage source;

current limiting means connected in series with said primary voltage source across said telephone circuit, adapted to place a voltage across said telephone circuit to produce a resulting current in said telephone circuit, the maximum value of said voltage being determined by a control signal and by the voltage source connected in series with said current limiting means;

a secondary voltage source;

voltage source switching means adapted to switch said secondary voltage source into series connection with said primary voltage source and place the combination of said primary and secondary voltage sources in series with said current limiting means across said telephone circuit;

control means connected to said current sensing means, and to said current limiting means, and controlling said switching means; said control means adapted to sense whenever continuity of said telephone circuit is opened and closed again, and having the following states:

(a) a first state in which said control signal is fixed to cause said current limiting means to maintain a conventional battery feed current in said telephone circuit, and in which said voltage source switching means is deactivated so that said secondary voltage source is not in series connection with said current limiting means; and (b) a second state commencing whenever said control means senses that continuity of said telephone circuit is opened and closed again, and continuing thereafter for a predetermined period of time; said control means progressively increasing the voltage placed across said telephone circuit by the following sequence of steps:

(1) changing said control signal to progressively increase the maximum voltage placed across said telephone loop by said current limiting means and said primary voltage source in at least one predetermined increment until said current sensing means indicates that the electrical current flowing in said telephone circuit exceeds its predetermined value, said control means thereafter maintaining said control signal for the remainder of said period of time, and then restoring said control signal to its first state; and (2) in the event step (1) fails to result in said current sensing means indicating that the electrical current flowing in said telephone circuit exceeds its predetermined value, actuating said voltage source switching means to switch said primary voltage source and said secondary voltage source in series connection with said current limiting means across said telephone circuit for the remainder of said period of time.

10. The sealing current generator of claim 9, wherein said current limiting means comprises:

a plurality of resistors in parallel connection with one another, and in series with said primary voltage source; and a number of switching means controlled by control signals provided by said control means, each switching means in series connection with one of said resistors, said switching means adapted to permit said control means to selectively control which of said resistors are in parallel combination with one another.

11. The sealing current generator of claim 9, further comprising a longitudinal balance circuit connected to said telephone circuit.

12. A sealing current generator for a telephone circuit, said generator comprising:

current sensing means adapted to sense whether the electrical current in said telephone circuit exceeds 30 milliamperes;

a primary voltage source;

current limiting means connected in series with said primary voltage source across said telephone circuit, adapted to generate a current in said telephone circuit, the maximum value of said current being determined by a control signal and by the voltage source connected in series with said current limiting means;

a secondary voltage source;

voltage source switching means adapted to switch said secondary voltage source into series connection with said primary voltage source and place the combination of said primary and secondary voltage sources in series with said current limiting means across said telephone circuit;

control means connected to said current sensing means, and to said current limiting means, and controlling said switching means; said control means adapted to sense whenever continuity of said telephone circuit is opened and closed again, and having the following states:

(a) a first state in which said control signal is fixed to cause said current limiting means to maintain a current of approximately 30 milliamperes in said telephone circuit, and in which said voltage source switching means is deactivated so that said secondary voltage source is not in series connection with said current limiting means; and (b) a second state commencing whenever said control means senses that continuity of said telephone circuit is opened and closed again, and continuing thereafter for a predetermined period of time of approximately 3 to 5 seconds; said control means employing the following sequence of steps:

(1) changing said control signal to increase the maximum current placed in said telephone loop by said current limiting means to approximately 50 milliamperes; and (2) in the event step (1) fails to result in said current sensing means indicating that the electrical current flowing in said telephone circuit exceeds 30 milliamperes, actuating said voltage source switching means to switch said primary voltage source and said secondary voltage source in series connection with said current limiting means across said telephone circuit for the remainder of said period of time.

* * * * *

UNITED STATES PATENT AND TRADEMARK OFFICE
CERTIFICATE OF CORRECTION

PATENT NO. : 5,131,033

DATED : July 14, 1992

INVENTOR(S) : Peter M. Reum

It is certified that error appears in the above-indentified patent and that said Letters Patent is hereby corrected as shown below:

Column 3, line 26, delete "Q11" and substitute --Q10--.

Column 3, line 39, delete "output of U" and substitute --output of U6--.

Signed and Sealed this

Seventeenth Day of August, 1993

*Attest:*

BRUCE LEHMAN

*Attesting Officer*    *Commissioner of Patents and Trademarks*